Nov. 28, 1967　　　A. G. SCHRAMM　　　3,354,982
STEERABLE TRAILER WHEEL MECHANISM
Filed Jan. 20, 1966　　　　　　　　　　　　4 Sheets-Sheet 1
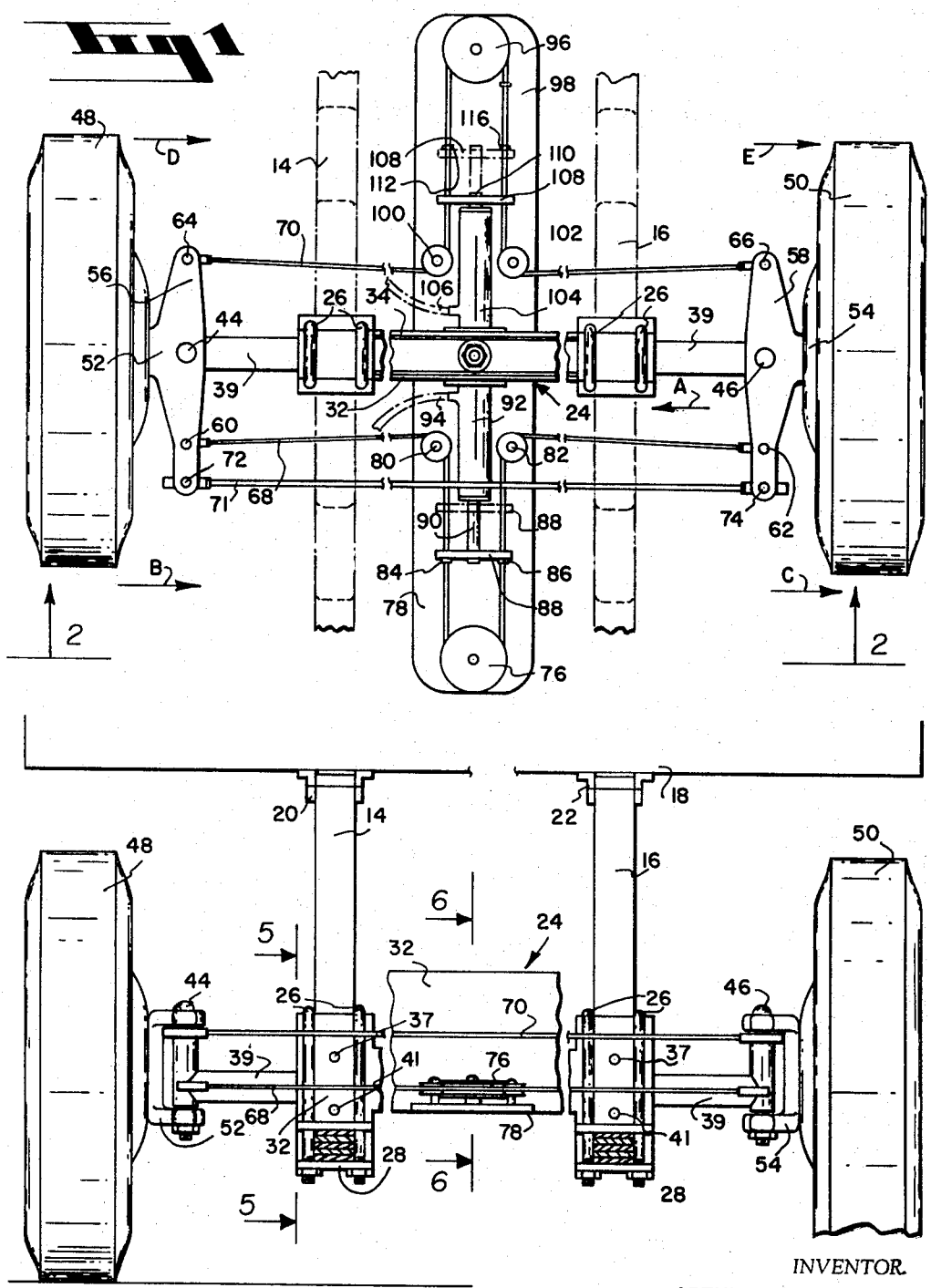
INVENTOR.
ARTHUR G. SCHRAMM
BY
Wm. H. Dean

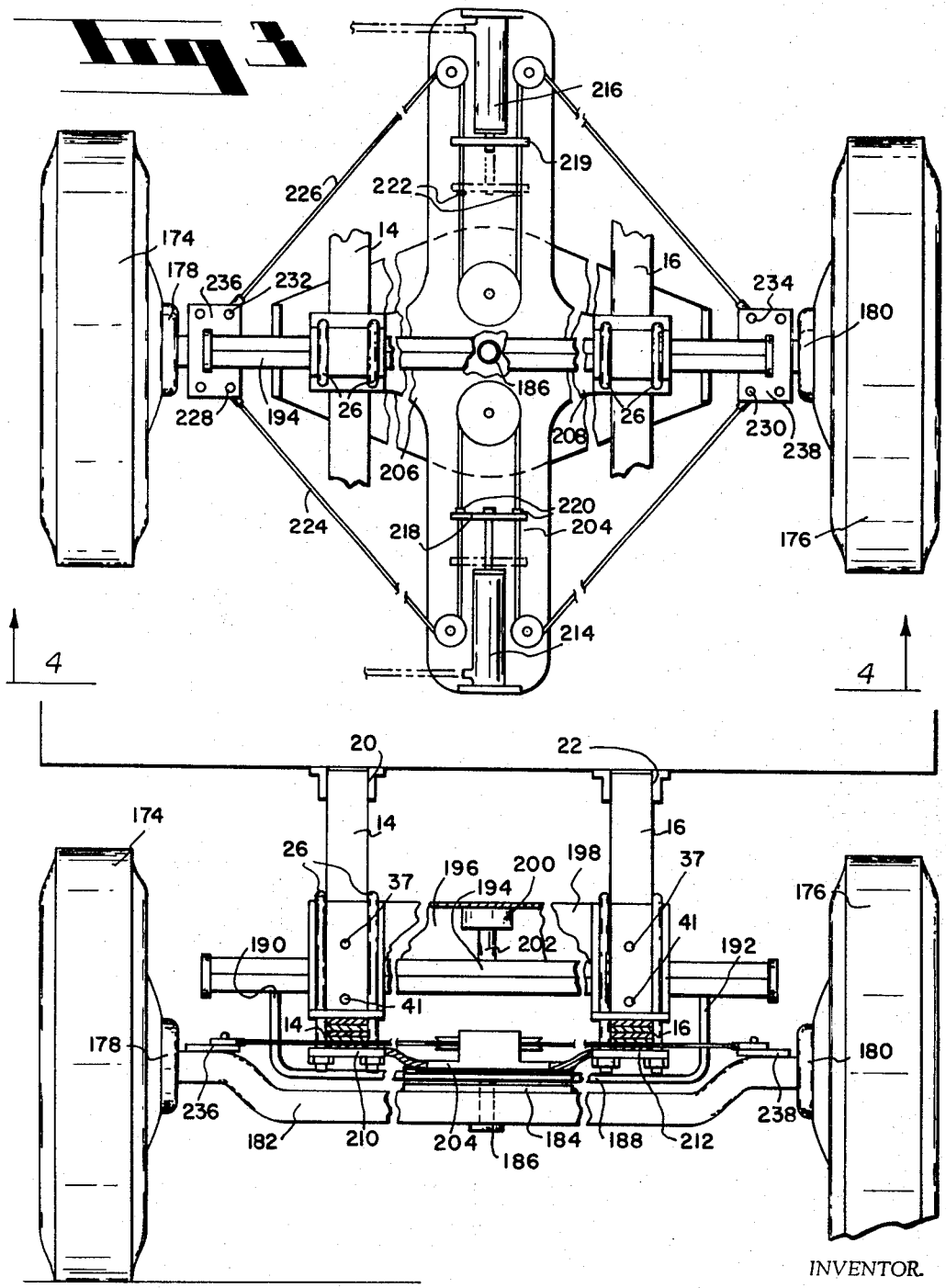

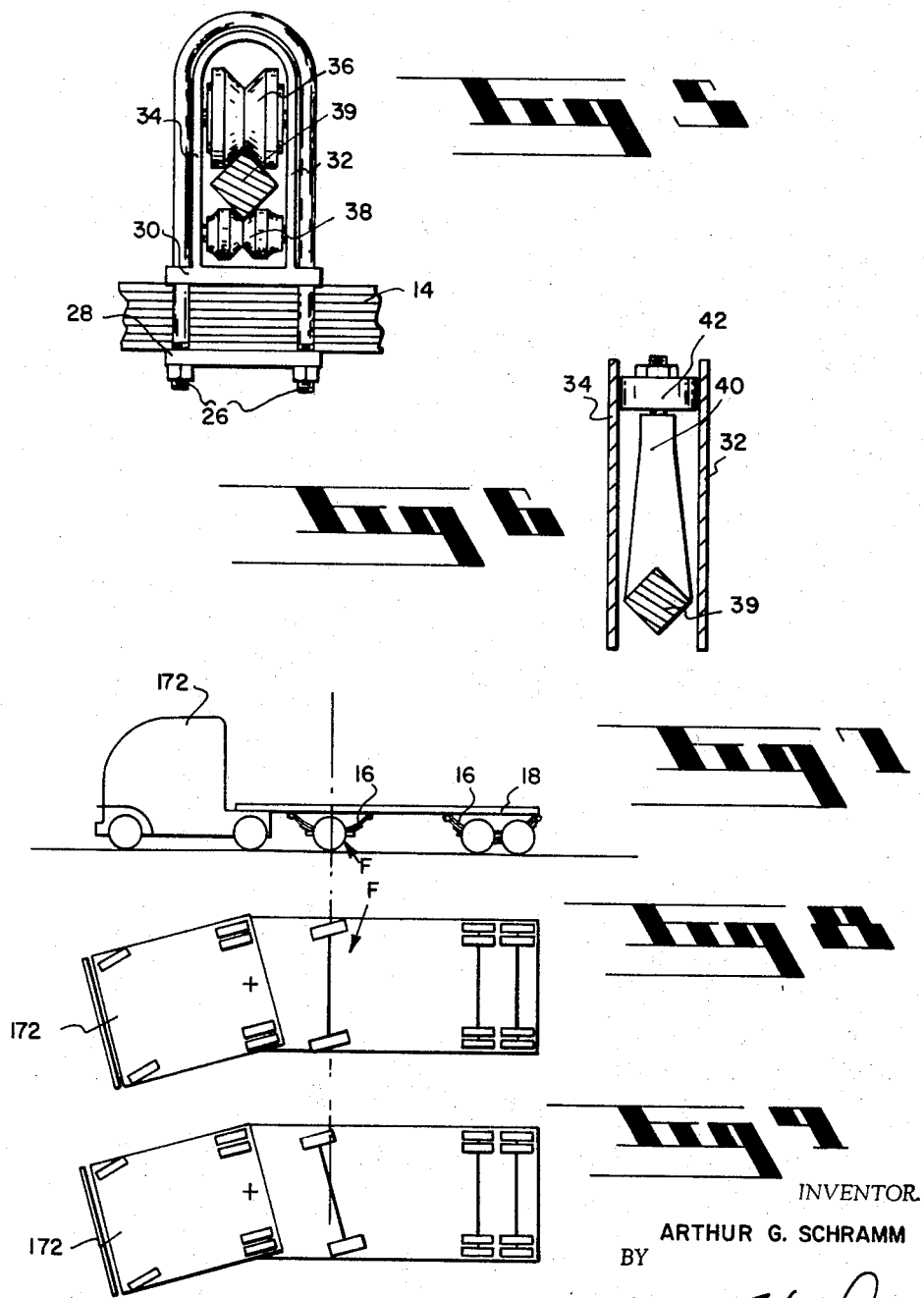

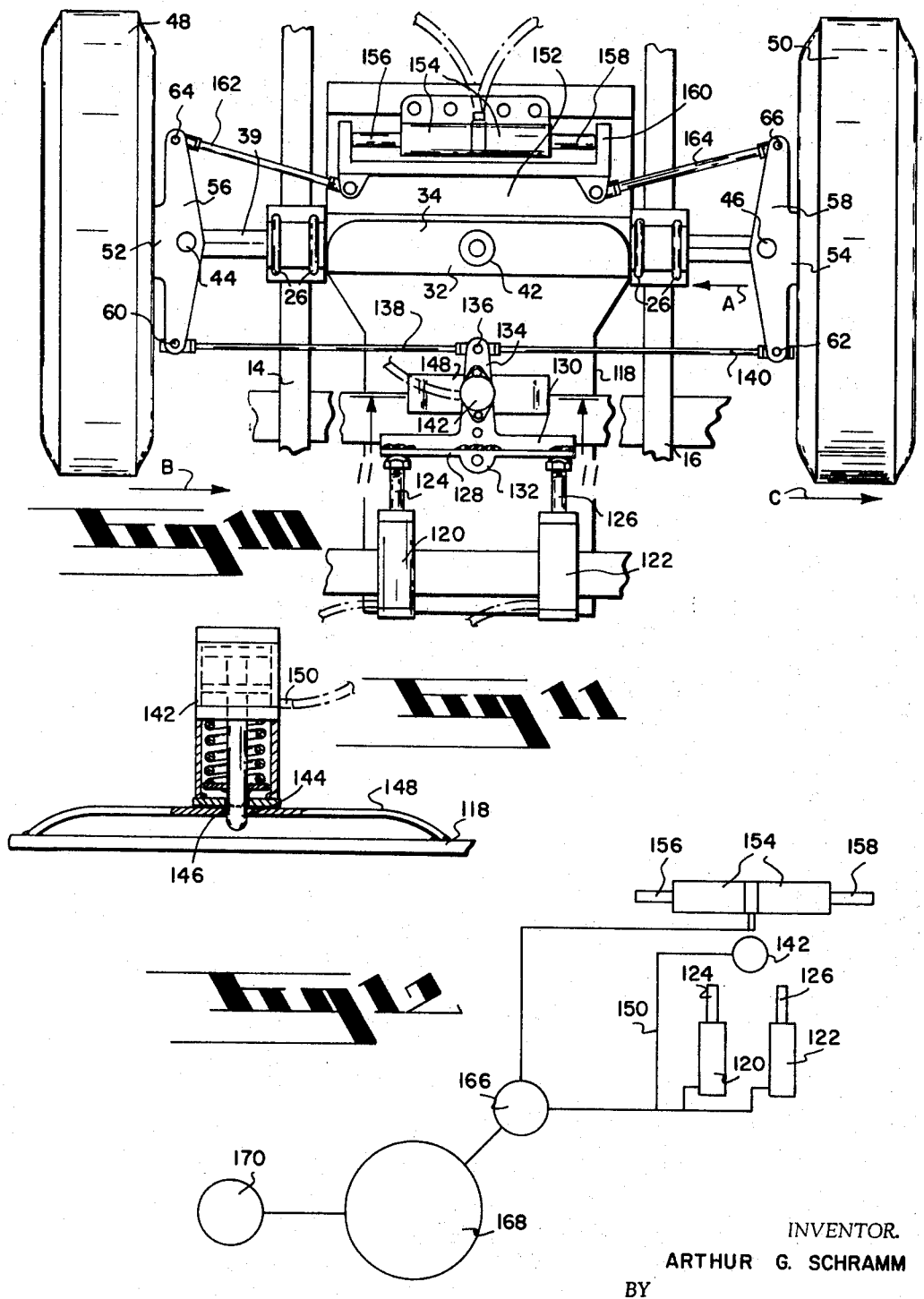

United States Patent Office 3,354,982
Patented Nov. 28, 1967

3,354,982
STEERABLE TRAILER WHEEL MECHANISM
Arthur G. Schramm, 4632 N. 49th Place,
Phoenix, Ariz. 85018
Filed Jan. 20, 1966, Ser. No. 521,766
10 Claims. (Cl. 180—79.2)

ABSTRACT OF THE DISCLOSURE

A steerable trailer wheel mechanism adapted to steer supporting wheels of a trailer to the right or to the left by forces imposed upon the wheels in a direction laterally of the forward and rearward movement directions of the vehicle, and first and second steering means adapted to steer said wheels about a substantially vertical axis in opposite directions, said first and second steering means coupled to the wheels and the frame of the vehicle, and capable of steering the wheels in opposite directions, respectively, when the wheels are moved in a direction laterally of the forward and rearward vehicle direction of movement, whereby the steerable wheels are automatically steerable, when the vehicle is moved in a forward direction or a rearward direction.

---

This invention relates to a steerable trailer wheel mechanism, and more particrlarly, to a steerable trailer wheel mechanism for use with tandem axles on trucks, or the like, for automatically steering the wheels of the tandem axles either when the respective vehicle is moving in a forward direction or in a reverse direction.

In the trucking industry, the load carrying capacity of a vehicle has become extremely important, particularly with relation to the load bearing characteristics of roadbeds and a relation between the bearing area of the vehicle tires in proportion to the load being carried by the vehicle, such that the conventional roadbeds are not over loaded by highly concentrated loading of individual vehicle wheels. A solution to this problem might be had by employing a plurality of tandem axles under a truck bed and such an arrangement would be quite satisfactory when moving on relatively straight roadways, however, conventional non-steerable tandem axles are difficult to operate when negotiating short turns. As for example, right angle turns at the intersections of roadways. As the number of axles is increased, the steering problems become increasingly more critical and difficult and accordingly, it is apparent that the problem of steering tandem axles must be solved in order to permit trucks to be equipped with a large plurality of tandem axles so that sufficient tire bearing area on roadways may be afforded in order to carry heavy loads without unduly stressing the roadway at the points of contact of the tires therewith.

Accordingly, it is an object of the present invention to provide a steerable trailer wheel mechanism which may be applied to a large plurality of tandem axles on a single vehicle, whereby a roadway traversing vehicle may be very heavily loaded and whereby a large number of tires supporting the vehicle on the roadway each tend to distribute the load over a large surface area of the roadway to thereby avoid undue stressing or concentration of forces at the contact of the tires with the roadway.

Another object of the invention is to provide a steerable trailer wheel mechanism particularly adapted for use with vehicle tandem axles and which is automatically steerable either in a forward moving direction of the vehicle or a reverse direction thereof.

Another object of the invention is to provide a very simple and reliable steerable trailer wheel mechanism, wherein forward and rearward steering means is actuated by force applied to the wheels to be steered in a direction substantially parallel to their rotating axes, such that as the wheels move in connection with the axles mechanism in a direction parallel to the said axes, the forward and rearward steering mechanism stationarily coupled to the respective vehicle frame may cause pivoting of the wheels about a substantially vertical axis automatically to steer them and whereby either the forward or the rearward steering mechanism may be fixed in position to automatically steer the wheels in a respective forward or rearward directional movement of the vehicle.

Another object of the invention is to provide a steerable trailer wheel mechanism which automatically steers the wheels of a trailer in one direction when the vehicle is moving forward and in the reverse direction when the vehicle is reversed.

Another object of the invention is to provide a steerable trailer wheel mechanism having novel steering holding devices independently operable to control forward or reverse steering of wheels on a trailer axle mechanism.

Further objects and advantages of the present invention may be apparent from the following specification, appended claims and accompanying drawings, in which:

FIG. 1 is a fragmentary top or plan view of a steerable trailer wheel mechanism;

FIG. 2 is a view taken from line 2—2 of FIG. 1, showing a fragmentary portion of a frame in connection with the steerable trailer wheel mechanism of the invention;

FIG. 3 is a fragmentary plan of a modified form of the invention;

FIG. 4 is a view taken from the line 4—4 of FIG. 3;

FIG. 5 is an enlarged fragmentary sectional view taken from the line 5—5 of FIG. 2;

FIG. 6 is an enlarged fragmentary sectional view taken from the line 6—6 of FIG. 2;

FIG. 7 is a side elevational view of a truck having a trailer coupled therewith; said trailer having tandem axles;

FIG. 8 is a bottom plan view of the truck and trailer shown in FIG. 7 and showing diagrammatically a steerable trailer wheel mechanism on the trailer in accordance with the invention and similar to the structure shown in detail in FIGS. 1 and 2 of the drawings;

FIG. 9 is a view similar to FIG. 8, but showing the modified form of steerable trailer wheel mechanism in accordance with the invention as illustrated in FIGS. 3 and 4 of the drawings;

FIG. 10 is a fragmentary plan view similar to FIG. 1, but showing a further modified form of the invention;

FIG. 11 is an enlarged fragmentary sectional view taken from the line 11—11 of FIG. 10; and FIG. 12 is a diagrammatic view of the hydraulic equipment of the steerable trailer wheel mechanism, as shown in FIG. 10 of the drawings.

As shown in FIGS. 1 and 7 of the drawings, the steerable trailer wheel mechanism of the invention is provided with an axle suspension means comprising a pair of semi-elliptical springs 14 and 16 connected in the conventional manner to a frame 18 by conventional shackles 20 and 22. As shown in FIG. 7, the semi-elliptical springs 16 are substantially conventional springs. The axle suspension means of the invention also comprises a slide bearing assembly 24, as shown in FIGS. 5 and 6, wherein the springs 14 and 16 are engaged by clamp bolts 26 which straddle these springs and force opposed clamp plates 28 and 30 to grip upper and lower portions of these springs. Also, carried by the U-bolts 26 and integral with the plate 30 are a pair of plates 32 and 34 between which rollers 36 and 38 are mounted. These rollers 36 and 38 are in pairs preferably disposed directly above each of the plates 28. An axle 39 generally rectangular in cross-section is engaged by the rollers 36 and 38 which are provided with V-notch grooves in which the axle is intimately engaged. Also, connected rigidly to the axle is an arm 40 having a roller 42 rotatably mounted on an upstanding portion of the arm 40 and operating in a rolling position between the plates 32 and 34 such as to stabilize the axle 39 and hold it at its cross-sectional disposition to maintain kingpins 44 and 46, shown in FIGS. 1 and 2, on substantially vertical axes with exception of a slight caster angle normally employed in connection with steerable wheels.

Accordingly, it will be appreciated that the axle 39 is free to slide longitudinally of its axis with respect to the axle suspension means due to the rolling action of the rollers 36 and 38 and that the arm 40 having the roller 42 operating between the plates 32 and 34 provides cross-sectional disposition of the axle 38, such that the kingpins 44 and 46 will be at all times maintained substantially vertical for the purpose of pivoting the respectively connected wheels 48 and 50 about the axes of the kingpins 44 and 46. These kingpins 44 and 46 constitute a vertical axis means, as defined herein, by which the wheels are steerable.

The wheels 48 and 50 are provided with hub structures 52 and 54 having steering arms 56 and 58 provided with forwardly directed steering connections 60 and 62 which are forward of the kingpins 44 and 46. These arms 56 and 58 are also provided with steering connections 64 and 66 which are disposed rearward relative to the axes of the kingpins 44 and 46. These steering connections 60, 62, 64 and 66 are conventional pivotal connections and provide connections for steering cables 68 and 70.

Pivotally connected between the arms 56 and 58 is a tie rod 70 having its opposite ends pivotally connected at 72 and 74 on the steering arms 56 and 58.

Opposite ends of the cable 68 are connected at the connection 60 and 62 and an intermediate portion of the cable 68 passes over a pulley 76 mounted on an extending arm 78 of the plate 32. Also mounted on this arm 78 are pulleys 80 and 82 over which the cable 68 passes.

Fixtures 84 and 86 are fixed to the cable 68 in spaced relation to the pulleys 76 and these fixtures 84 and 86 are engageable by a cross bar 88 carried by a plunger 90 of a hydraulic cylinder 92. The portions of the cable 68 adjacent the fixtures 84 and 86 pass through holes in the bar 88 and are slidable therethrough.

The cylinder 92 is provided with an internal spring return for the plunger 90 and a hydraulic conduit 94 communicates with the interior of the cylinder 92 for conducting pressure fluid thereinto for extending the plunger 90 and the bar 88 to a solid line position as shown in engagement with the fixtures 84 and 86 to return or hold the cable 68 in a median position and to cause pivotal positioning of the wheels 48 and 50 about the axes of the kingpins 44 and 46, such that the wheels are directed in a normal forward and rearward direction to travel at substantially right angles to the axis of the axle 39.

An intermediate portion of the cable 70 is disposed over a pulley 96 pivotally mounted on an extension 98 of the plate 34. Also mounted on the extension 98 are pulleys 100 and 102 over which the cable 70 passes. A cylinder 104 similar to the cylinder 92 is provided with a hydraulic pressure fluid conduit 106 similar to the conduit 94. A bar 108 similar to the bar 88 is carried by a plunger 110 of the cylinder 104 which employs a spring return and which is hydraulically extendable to a broken line position, as shown in FIG. 1 of the drawings. Fixtures 112 and 116 are similar to the fixtures 84 and 86.

Thus, the cylinders, pulleys and cables constitutes steering means for forward and backward operations and the cylinders also carry the bars 88 and 108 which serve in connection with the fixtures 84 and 86 and 112 and 116 as centering means, as will be hereinafter described in detail.

In operation, the steerable trailer wheel mechanism, as shown in FIGS. 1, 2, 5, 6, and 7, may be utilized to automatically steer the wheels of tandem axles on trucks or the like in either the forward or reverse directions, it being understood that wheels must be steered in an opposite direction when reversing as compared to the direction of normal steering of such wheels when moving in forward direction.

As shown in FIGS. 1 and 2, the wheels 48 and 50 may be pivoted about the axes of the kingpins 44 and 46 when the axle 39 is forced to move in relation to the rollers 36 and 38 longitudinally of the axis of the axle 39 and at substantially right angles to the normal forward rolling direction of the wheels 48 and 50. It will be seen that the rollers 36 and 38 rotate about respective axles 37 and 41 carried between the plates 32 and 34. When the axle 39 moves in a direction of an arrow A in FIG. 1, relative to the axle suspension means, it rolls between the rollers 36 and 38 about respective axles 37 and 41 carried between the plates 32 and 34. When the axle 38 moves in the direction of the arrow A and the bar 88 holds the fixtures 84 and 86 centered, the cable 68 cannot move, but the cable 70 may move due to the fact that the bar 108 is retracted to the solid line position bringing the fixtures 112 and 116 free to move and leaving the cable 73 to move over the pulleys 96, 100 and 102. Thus, as the axle 38 moves in the direction of the arrow A under these conditions, the cable 68 being stationary causes the wheels 48 and 50 to be steered in directions of the arrows B and C.

Conversely when the bar 88 is retracted to its broken line position and the bar 108 is extended to its broken line position, the fixtures 112 and 116 center the cable 70 and the cable 68 is released. Thus, when the axle 38 is moved in the same direction of the arrow A, the cable causes the wheels 48 and 50 to be pivoted in the opposite direction of the arrows D and E about the axes of the kingpins 44 and 46. In this manner, either cylinder 92 or 104 may be energized to extend its respective plunger to center either the cables 68 or 70 and to provide optional setting for either forward or rearward steering of the wheels on tandem axles such as the tandem axle assembly F, shown in FIGS. 7 and 8 of the drawings.

In the modification of the invention, as shown in FIGS. 10, 11 and 12 of the drawings, the plate 32 is provided with an extension 118 carrying a pair of hydraulic cylinders 120 and 122 having respective plungers 124 and 126 engageable with opposite ends 128 of a bell crank 130 which is pivoted on a pin 132 at an intermediate location between axes of the plungers 124 and 126. This bell crank 130 is provided with a steering arm 134 having a pivotal steering connection 136 to which adjacent ends of the pair of tie rods 138 and 140 are connected. An opposite end of the tie rod 138 is pivotally connected at the pivotal connection 60 and a similar opposite end of the tie rod 140 is connected to the steering connection 62. The structure, as shown in FIG. 10 of the drawings, eliminates the tie rod 70, shown in FIG. 1, since the tie rod members 138 and 140 are substantially rigid members.

Mounted on the arm 134 is a locking facility 142 having a plunger 144 engageable through an opening 146 in a bearing plate 148 carried on the plate 118. The plunger 146 is provided with a spring return and is extendable hydraulically by pressure fluid conducted through a conduit 150, as shown also in FIG. 12 of the drawings. The cylinder plunger 146 is thus disposed to lock the steering arm 134 in centered position and the area ratio, as compared to that of the cylinders 120 and 122 is such that a relatively lower hydraulic pressure will retract the plunger 146, then will operate the plungers 124 and 126 to cause steering of the wheels 48 and 50 about the axes of the kingpins 44 and 46.

Thus, the cylinders 120 and 122 are adapted for use in steering the wheels 48 and 50 in a forward direction comparable to the directions of the arrows B and C, as shown in FIG. 1 of the drawings, when the axle 38 is moved in the direction of the arrow A.

A reverse steering mechanism comprises an extension 152 of the plate 34 which carries a double ended hydraulic cylinder 154. This cylinder 154 is provided with opposed plungers 156 and 158 bearing oppositely on a steering frame 160 which is movable relative to the extension 152 and the cylinder 154. Tie rods 162 and 164 interconnect opposite ends of the steering frame 160 and the steering connections 64 and 66, respectively. Thus, when the plungers 156 and 158 are fully extended, the tie rods 162 and 164 are centered about the axes of the kingpins 44 and 46, such that the wheels are disposed to roll in a direction normally at right angles to the axis of the axle 38. The tie rods 162 and 164 operate in substantially the same manner as the cable 70 when released by the plungers 156 and 158 and the tie rods 138 and 140 operate in substantially the same manner as the cable 70 when the plungers 124 and 126 are retracted and when the plunger 146 is retracted. It will be appreciated by those skilled in the art that when the axle 38 is moved in the opposite direction of the arrow A, as shown in FIGS. 1 and 10, that steering of the wheels 48 and 50 will be opposite to the directions of the arrows B, C, D and E, as hereinbefore described.

The hydraulic cylinders 120, 122 and 154 are coupled through a threeway valve 166 to a fluid pressure accumulator 168 supplied by a pump 170. The valve 166 may be used selectively to operate either the cylinders 120 and 122 or the cylinder 154 to center the tie rods 138 and 140 or the tie rods 162 and 164, respectively.

Operation of the modification, as shown in FIGS. 10, 11 and 12, is substantially the same as that shown in FIG. 1, except that the tie rod structure shown in FIGS. 10, 11 and 12, is rigid as compared to the equivalent cables 68 and 70 and the structure of FIGS. 10, 11 and 12 does not apply to a rigid tie rod 70.

From the foregoing it will be understood that the mode of operation illustrated in FIG. 8 of the drawings is related to the foregoing structure disclosed in FIGS. 1 and 10 of the drawings, and that a steering movement of a trailer tractor 172 may be accomplished to cause a tandem axle F to move longitudinally along its axis to accomplish the foregoing steering operations. It will also be apparent to those skilled in the art that when the axle is moved in opposite directions longitudinally relative to its axis, that the forward and rearward steering mechanisms, hereinbefore described, will provide for opposite steering directions of the wheels with the same direction of axle movement or will steer in the same direction with opposite directions of axle movement. Accordingly, it will also be appreciated that the hydraulic cylinder centering means for the forward and rearward steering provides a very simple means by which the axle steering mechanism may be remotely operated by means of the valve 166 which may be in the cab of the tractor 172, such as to change or preset the steering mechanisms of the tandem axles to steer either in the forward or reverse directions, as may be desired by the operator of the tractor 172. As disclosed in FIG. 8 of the drawings, the tractor 172 is turned causing lateral force on the trailer causing the trailer to move laterally and longitudinally relative to the steerable axle which causes it to slide in the axle suspension means and to turn the wheels about the substantially vertical axes of the kingpins 44 and 46.

In the modification, as shown in FIGS. 3 and 4 of the drawings, a difference exists in the mechanism primarily in the disposition of the vertical axis about which the wheels are steered. In this modification, rather than using kingpins, a central vertical axis is disposed midway between the wheels and the entire axle with fixed wheel bearings thereon pivots about a point intermediate the wheels, all as will be hereinafter described in detail.

Referring to FIGS. 3 and 4 of the drawings, it will be seen that wheels 174 and 176 are rotatably mounted on fixed axes concentric of hubs 178 and 180 of the wheels which contain bearings rotatably mounting the wheels on axes parallel to the longitudinal axis of the axle. The axle 182, thus, is carried by the wheels 174 and 176. Mounted on the axle 182 is a turntable plate 184 having a vertical axis bolt 186 passing upward therethrough and pivotally mounted a second superimposed turntable plate 188. Between these plates 184 and 188 are thrust bearings tending to support the plate 188 on the plate 184. The plate 184 being fixed to the axle 182 while the plate 188 is free to rotate on trust bearings carried by the plate 184.

The plate 188 is provided with outwardly directed arms 190 and 192 supporting a rectangular in cross-section bar 194 similar to the cross-section of the axle shown in FIG. 5 of the drawings. This bar 194 is slidably mounted between rollers 36 and 38 mounted on axles 37 and 41.

Plates 196 and 198 are similar to the plates 32 and 34 and the roller 200 is similar to the roller 42 and operates between the plates 196 and 198. This roller 200 is connected by an arm 202 with the bar 190 serving a function similar to the arm 40 disclosed in FIG. 6 of the drawings.

A steering frame plate 204 is secured by portions 206 and 208 to the suspension plates 210 and 212 located similarly with respect to the plate 28, shown in FIG. 5 of the drawings. This steering frame plate 204 carries a forward steering cylinder 214 functioning similarly to the cylinder 92 and a rearward steering cylinder 216 functioning similarly to the cylinder 104. These cylinders are provided with respective plunger operated bars 218 and 219 operable against fixtures 220 and 222 secured to cables 224 and 226. These cables 224 and 226 functioning similarly to the cables 68 and 70, shown in FIG. 1 of the drawings.

The opposite ends of the cable 224 are connected at 228 and 230 while opposite ends of the cable 226 are connected at 232 and 234 with the axle 182 by means of connection plates 236 and 238, respectively. Shackle bolts 26 connect the springs 14 and 16 with the suspension means comprising the plates 196 and 198 and the rollers 36 and 38 carrying the bar 194.

The springs 14 and 16 are connected to a frame 18 by means of conventional shackles 20 and 22 similar to those disclosed in FIGS. 1 and 2 of the drawings.

It will be seen that the difference in the structures disclosed in FIGS. 1 and 3, is comprised of the vertical axis of the bolt 186 about which the turntable components are relatively pivoted to each other, both of which are movable laterally with the axle and the bar 190 in a direction longitudinally relative to the axes of the wheels 174 and 176. The turntables 184 and 188 being movable relative to the frame plate 204 in such a manner that the axis of the bolt 186 forms a vertical steering axis for the axle 182 when moved back and forth relative to the springs 14 and 16. This movement causes pivotal movement in a similar manner as described in connection with FIGS. 1 and 2 of the drawings and with reference to the arrows A, B, C, D and E.

Various modifications of the present invention may be resorted to in a manner limited only by a just interpretation of the following claims.

I claim:
1. In a steerable trailer wheel mechanism the combination of: a frame; axle suspension means carried by said frame; an axle means movably mounted on said axle suspension means; steerable wheels rotatably mounted on said axle means, said axle means movable on said suspension means in opposite first and second actuating directions substantially at right angles to the normally forward and rearward rolling directions of said wheels; substantially vertical axis means on said axle means about which said wheels are pivotally steerable in first and second opposite steering directions at angles to said normally forward and rearward rolling directions; first and sec- ond steering means coupled to said wheels and said frame and operable in response to movement of said axle means on said axle suspension means in said first and second actuating directions, said first steering means adapted and disposed to steer said wheels in said first steering direction at an angle to said normally forward and rearward directions in response to movement of said axle means in said first actuating direction; said second steering means adapted and disposed to steer said wheels in said second steering direction opposite to said first steering direction and at an angle to said normally forward and rearward directions in response to movement of said axle means in said first actuating direction.

2. The invention as defined in claim 1, wherein said vertical axis means comprises a wheel supporting hub and a substantially vertical axis kingpin supporting each hub on said axle means.

3. The invention as defined in claim 1, wherein said vertical axis means comprises a vertical pivot and turntable structure supporting said axle means on said suspension means at a location midway between said wheels, said wheels having bearings about which they rotate and the axes of which are fixed relative to said axle means.

4. The invention as defined in claim 2, wherein said first and second steering means being opposed and disposed forward and rearward respectively, relative to said vertical axis means, said first steering means having reciprocal means provided with opposite end portions connected with said hubs of said wheels forwardly relative to the respective kingpin axes; said second steering means having reciprocal means provided with opposite end portions connected with said hubs of said wheels rearwardly relative to the respective kingpin axes; and first and second respective holding means for each of said first and second steering means respectively; each of said holding means mounted on said frame and disposed selectively to hold said respective reciprocal means stationary relative to said frame or to release the respective reciprocal means for movement relative to said frame.

5. The invention as defined in claim 3, wherein said first and second steering means are opposed and disposed forward and rearward respectively, relative to said vertical axis means, said first steering means having reciprocal means provided with opposite end portions connected with said axle means near said wheels; said second steering means having reciprocal means provided with opposite end portions connected with said axle means near said wheels; and holding means for each of said first and second steering means; each of said holding means mounted on said frame and disposed selectively to hold said respective reciprocal means stationary relative to said frame or to release the respective reciprocal means to move relative to said frame.

6. The invention as defined in claim 4, wherein said holding means comprises a hydraulic cylinder; a plunger for said cylinder and means operable by said plunger for centering and holding said holding means relative to said frame.

7. The invention as defined in claim 5, wherein said holding means comprises hydraulic cylinder means provided with a plunger and means operable by said plunger for centering and holding said reciprocal means of each of said steering means.

8. The invention as defined in claim 1, wherein said axle suspension means comprises springs supporting said frame and slide bearing means carried by said springs and supporting said axle means to move relative to said springs and said frame in said first and second actuating directions.

9. The invention as defined in claim 6, wherein said holding means is provided with locking means for holding said holding means stationary with said frame and for holding said reciprocal means centered and stationary relative to said frame.

10. The invention as defined in claim 9, wherein said locking means comprises a hydraulic cylinder and plunger and wherein said last mentioned plunger is operable at a lower pressure than the hydraulic cylinders of said holding means.

References Cited
UNITED STATES PATENTS
2,851,280  9/1958  Matteazzi et al. _____ 280—81

FOREIGN PATENTS
560,080  3/1944  Great Britain.

BENJAMIN HERSH, *Primary Examiner.*

J. H. BRANNEN, L. D. MORRIS *Assistant Examiners.*